United States Patent [19]
Kurosawa et al.

[11] Patent Number: 6,080,227
[45] Date of Patent: Jun. 27, 2000

[54] GAS TREATING APPARATUS

[75] Inventors: Masaji Kurosawa, Chiba; Katsuhiro Yamashita, Kanagawa; Takeya Kobayashi, Tokyo, all of Japan

[73] Assignee: Nichias Corporation, Tokyo, Japan

[21] Appl. No.: 09/185,688

[22] Filed: Nov. 4, 1998

[30] Foreign Application Priority Data

Nov. 5, 1997 [JP] Japan ................................. 9-318992

[51] Int. Cl.⁷ .................................................. B01D 53/06
[52] U.S. Cl. .............................. 96/111; 96/123; 96/125; 96/130; 96/144; 96/150
[58] Field of Search ............................ 96/111, 122, 123, 96/125–128, 130, 144, 146, 150

[56] References Cited

U.S. PATENT DOCUMENTS

| | | | |
|---|---|---|---|
| 2,993,563 | 7/1961 | Munters et al. | 96/125 X |
| 4,012,206 | 3/1977 | Macriss et al. | 96/125 X |
| 4,047,904 | 9/1977 | Worrall | 96/111 X |
| 4,134,743 | 1/1979 | Macriss et al. | 96/125 X |
| 4,281,465 | 8/1981 | Zimmermann et al. | 96/111 X |
| 4,409,006 | 10/1983 | Mattia | 55/28 |
| 4,414,003 | 11/1983 | Blaudszun | 96/111 X |
| 4,529,420 | 7/1985 | Norbäck | 96/123 |
| 4,729,774 | 3/1988 | Cohen et al. | 96/123 |
| 4,775,484 | 10/1988 | Schmidt et al. | 96/125 X |
| 4,846,855 | 7/1989 | Tsujimoto | 96/123 X |
| 4,926,618 | 5/1990 | Ratliff | 55/20 |
| 4,946,479 | 8/1990 | Izumo | 96/123 |
| 4,948,392 | 8/1990 | Rush | 96/125 X |
| 5,167,679 | 12/1992 | Maekawa et al. | 96/144 X |
| 5,242,473 | 9/1993 | Ogasahara | 96/125 |
| 5,389,125 | 2/1995 | Thayer et al. | 96/111 X |
| 5,512,083 | 4/1996 | Dunne | 96/125 X |
| 5,584,916 | 12/1996 | Yamashita et al. | 96/123 |
| 5,688,305 | 11/1997 | Graeff | 96/150 X |
| 5,701,762 | 12/1997 | Akamatsu et al. | 96/125 X |
| 5,891,219 | 4/1999 | Klobucar et al. | 96/144 X |

FOREIGN PATENT DOCUMENTS

| | | | |
|---|---|---|---|
| 2729345 | 1/1978 | Germany | 96/123 |
| 6-063345 | 3/1994 | Japan | 96/125 |
| 6-343819 | 12/1994 | Japan . | |
| 8-155252 | 6/1996 | Japan . | |
| 09313866 | 9/1997 | Japan . | |
| 2 308 317 | 6/1997 | United Kingdom . | |

*Primary Examiner*—Robert Spitzer
*Attorney, Agent, or Firm*—Flynn, Thiel, Boutell & Tanis, P.C.

[57] ABSTRACT

A VOC concentrating apparatus includes a honeycomb rotor. In order to lower concentration at an exit of adsorption and at the same time to be able to regulate the amount of air flow introduced into a desorbing zone, independently from the amount of cooling air, there are disposed a cooling zone, desorbing zone and an adsorbing zone in the honeycomb rotor. The honeycomb rotor rotates and thus passes through the zones one after another. After gas to be treated has passed through the adsorbing zone, concentration of VOC in the gas is measured on the exit side by a concentration detector. The cooling air is divided by a damper for regulating the amount of air flow, after having entered the cooling zone, and a part thereof enters the desorbing zone through a heater. Further air coming out therefrom is heated again by a heater to enter the desorbing zone and concentrated gas is removed.

6 Claims, 4 Drawing Sheets

- GAS TO BE TREATED
- ATMOSPHERE

- GAS TO BE TREATED
- CONCENTRATED GAS
- COOLING AIR

GAS TREATING APPARATUS

FIELD OF THE INVENTION

The present invention relates to a gas treating apparatus used for recovering solvent, etc. by concentrating volatile organic compound by means of a rotary honeycomb rotor.

BACKGROUND OF THE INVENTION

FIG. 3 shows a gas treating apparatus adopted heretofore as a rotor rotating type apparatus for concentrating volatile organic compound (hereinbelow abbreviated to VOC). A honeycomb rotor 31, which is a construction for treating gas in the concentrating apparatus, consists of a well-known honeycomb construction carrying adsorber, which can adsorb VOC with a high efficiency and is rotated continuously with a constant speed by a driving motor not indicated in the figure. On all the peripheral surface of the honeycomb rotor 31 there are disposed an adsorbing zone 32, a desorbing zone 33, which desorbs adsorbed VOC to recover adsorbing capacity of the honeycomb rotor, and a cooling zone 34, which cools the honeycomb rotor heated in the desorbing zone 33, separated from each other.

Consequently the honeycomb rotor 31 is moved by rotation so that it passes through the adsorbing zone 32, desorbing zone 33 and the cooling zone 34 one after another in this order.

Concentration of VOC is effected as follows. Gas to be treated, object to be treated, is introduced into the adsorbing zone 32 and VOC contained in the gas to be treated is adsorbed by adsorber disposed on the honeycomb rotor 31. Therefore the gas to be treated is transformed into clean gas, which is released in the atmosphere. The adsorber, which has adsorbed VOC, in the adsorbing zone 32, which has adsorbed VOC, is moved to the desorbing zone 33, as the honeycomb rotor rotates. In this desorbing zone 33 hot air heated by a heater 35 passes therethrough so that VOC adsorbed by the adsorber disposed on the honeycomb rotor is desorbed by this hot air. The VOC thus desorbed forms concentrated gas and solvent is recovered. FIG. 5 shows a solvent recovering equipment using such a concentrating apparatus as described above.

Since the honeycomb rotor 31 is heated by hot air in the desorbing zone 33, adsorbing capacity of the adsorber disposed on the rotor decreases. In order to recover the adsorbing capacity of the adsorber, the adsorber, which has been in the desorbing zone 33, is moved to the cooling zone 34, as the honeycomb rotor 31 rotates. After having cooled the adsorber by making air in the atmosphere pass through the honeycomb rotor 31 there, the adsorber, which has been in the cooling zone 34, is moved again to the adsorbing zone 32, as the honeycomb rotor 31 rotates.

In this apparatus air effecting desorption and air effecting cooling are used in the form of a continuous flow for the purpose of recovering evacuated heat. That is, atmosphere (air) enters the cooling zone 34 and there receives sensible heat stored in the honeycomb rotor 31 so that hot air flow is formed. This hot air flow is heated by the heater 35 to a temperature required for desorption and introduced into the desorbing zone 33. Thereafter it is taken out as concentrated gas and sent to an after-treatment step.

In the rotor rotating type volatile organic compound concentrating apparatus described above adsorption and desorption of VOC are balanced and required desorption energy is determined, depending on adsorbed amount of VOC and moisture in the gas to be treated. This desorption energy is given by a product of desorption temperature by amount of air flow.

Heretofore the desorbing step was effected by making open air pass through the rotor after having been heated by a heater or a heat exchanger. Desorption gas coming out from the rotor becomes concentrated gas, which is subjected to an after-treatment step, where it is burnt or recovered.

Heating temperature of the rotor is limited by the capacity of the heater or heat exchanger and utility therefor (heat source, electric power, etc.).

In particular, in case where the gas to be adsorbed is wet, more desorption energy is required. When the amount of air flow for desorption is increased in order to increase the desorption energy, the amount of flow of the concentrated gas subjected to the after-treatment step increases also, which lowers the concentration of VOC. For this reason, efficiency of the after-treatment step is worsened, which enlarges the apparatus or increases amount of used utility.

For example, in case where the after-treatment of the concentrated gas is combustion using catalyzer, the concentrated gas is burnt with combustion improver. At this time, if the VOC concentration is low and the amount of air flow is great, the amount of used combustion improver increases.

If the amount of air flow for desorption is decreased, corresponding to the after-treatment, desorption is effected insufficiently so that VOC and moisture remaining in the rotor increase. Then adsorption capacity decreases so that the concentration at the exit of the adsorption rises and the magnification of connection lowers.

SUMMARY OF THE INVENTION

A first object of the present invention is to raise the regeneration efficiency of a gas treating apparatus using a rotating honeycomb rotor as a concentrating apparatus.

A second object of the present invention is to provide a gas treating apparatus using a rotating honeycomb rotor capable of satisfying both the requirement of lowering further the concentration at the exit of the adsorption and the requirement that it is desired not to decrease the amour of cooling air.

In order to achieve the first object, a gas treating apparatus, in which a honeycomb rotor is driven so that it passes through an adsorbing zone, a desorbing zone, a drying zone and a cooling zone one after another in this order, gas to be treated being made to pass through the adsorbing zone, at the same time air, which has passed through the cooling zone, being heated, and concentrated gas is taken out while introducing the air thus heated into the desorbing zone, is characterized in that it comprises further first heating means disposed so as to heat the air, which has passed through the cooling zone, and to introduce it into the desorbing zone and second heating means disposed so as to heat air, which has passed through the drying zone and to introduce it into the desorbing zone.

Further, in order to achieve the second object, a gas treating apparatus, in which a honeycomb rotor is driven so that it passes through an adsorbing zone, a desorbing zone and a cooling zone one after another in this order, gas to be treated being made to pass through the adsorbing zone, at the same time air, which has passed through the cooling zone, being heated, and concentrated gas is taken out while introducing the air thus heated into the desorbing zone is characterized in that it comprises further control means for controlling amount of heated air passing through the desorbing zone by removing a part of air, which has passed through the cooling zone.

A gas treating apparatus can have, the desorbing zone divided into a plurality of zones and the control means is disposed in either one of the zones.

A gas treating apparatus can further include means for measuring cleaning efficiency in the adsorbing zone.

A gas treating apparatus can include further means for measuring concentration at an exit of the last zone of the desorbing zones.

A gas treating apparatus can include a control means having a damper for regulating the amount of air flow.

In a first mode of realization of the present invention, in a gas treating apparatus using a honeycomb rotor passing through different zones one after another, which are an adsorbing zone, a desorbing zone, a drying zone and a cooling zone, there are disposed first and second heating means for the purpose of heating air, which has passed through the cooling zone, to introduce it into the drying zone, and heating air, which has passed through the drying zone, to introduce it into the desorbing zone, respectively.

Owing to such a construction, since it can be said that gas to be treated passes twice through the desorbing zone, concentration in the concentrated gas is raised and amount of heat for desorbing VOC increases. Therefore regeneration efficiency is increased.

In a second mode of realization of the present invention, in a gas treating apparatus using a honeycomb rotor passing through different zones one after another, which are an adsorbing zone, a desorbing zone and a cooling zone, there is disposed control means for controlling amount of heated air passing through the desorbing zone by removing a part of air, which has passed through the cooling zone, when air, which has passed through the cooling zone, is heated and introduced into the desorbing zone.

Gas containing volatile organic compound at a high concentration passes through the adsorbing zone in the honeycomb rotor. At this time, volatile organic compound is adsorbed by adsorber carried by the honeycomb rotor. Therefore the gas is transformed into gas containing volatile organic compound at a low concentration, i.e. it is cleaned.

The volatile organic compound adsorbed by the adsorber in the honeycomb rotor is separated therefrom to be released into heated air owing to the fact that air heated by a heater passes through the honeycomb rotor in the desorbing zone. As the result, air, which has passed through the desorbing zone, is concentrated gas containing volatile organic compound at a high concentration.

Since heated air has passed through the honeycomb rotor in the desorbing zone so that the honeycomb rotor has been heated to a high temperature, adsorbing capacity of the adsorber has become insufficient. Therefore the adsorber is cooled in the cooling zone by making air pass therethrough. In this way adsorbing capacity of the adsorber is recovered satisfactorily.

Air, which has passed through the cooling zone, is heated by the heater and mode pass through the desorbing zone to release volatile organic compound.

The desorbing zone may be either a single zone or divided into two or more than two zones. In this way it is possible to raise the concentration in the concentrated gas. In this case the means described above may be disposed for either one desorbing zone.

According to the present invention amount of heated air passing through the desorbing zone is controlled. By this control method a cleaning efficiency is calculated by using a following equation, starting from a value obtained by measuring the concentration at the exit of the adsorbing zone (treatment exit concentration) and a value obtained by measuring the concentration in the gas to be treated introduced into the desorbing zone (treatment entrance concentration) and this cleaning efficient being decided at a certain value, the control is effected by removing a part of air, which has passed through the cooling zone, by means of the control means so that the cleaning efficiency remains below the value thus decided.

When the gas to be treated contains a plurality of kinds of organic compounds, the treatment exit concentration and the treatment entrance concentration are represented by sums of respective concentrations.

Cleaning efficiency (%)=[1-treatment exit concentration/treatment entrance concentration (ppm)]×100.

In this case, the treatment entrance concentration and the treatment exit concentration are measured by using predetermined concentration measuring instruments and the cleaning efficiency is calculated by using respective measured values. The control means is driven manually or automatically so that the efficiency thus obtained remains below the predetermined value.

As another method, a method may be adopted, in which the exit concentration of the last desorbing zone among a plurality of desorbing zones, and a certain value being predetermined for this concentration, the amount of heated air passing through the desorbing zone is controlled so that the concentration is below this predetermined value.

The measurement of the concentration is effected by using e.g. well-known hydrocarbon meters. The principle of these hydrocarbon meters will be explained in a simple manner, referring to FIG. 6.

A part for measuring the concentration consists of a nozzle 51 for forming a hydrogen flame and two electrodes 52 disposed above the nozzle. Hydrocarbon containing gas, whose concentration is to be measured, is supplied to the nozzle together with hydrogen, while a hydrogen flame is produced from the nozzle. Then hydrocarbon becomes in a state of ions in the hydrogen flame and an ion current flows through the two electrodes from a DC power supply 54. The concentration can be measured by recording this current by means of a recorder 53.

For example, a well-known damper for regulating amount of air flow is used as means for removing a part of air, which has passed through the cooling zone.

In order to maintain the cleaning efficiency below a predetermined value, it is necessary to determine how much air, which has passed through the cooling zone, should be removed. For obtaining a relationship between the cleaning efficiency and the amount of air to be removed, it is sufficient to investigate previously a relation between the cleaning efficiency and a degree of opening of the damper for regulating amount of air flow.

For the method, by which a value is predetermined for the cleaning efficiency and the damper for regulating amount of air flow is regulated so that the cleaning efficiency is below the predetermined value, it is possible to adopt a method, in which the damper for regulating amount of air flow is previously set so that it corresponds to the predetermined value of the cleaning efficiency by using the relationship therebetween, a method in which the damper for regulating amount of air flow is regulated, linked with the concentration measuring instrument, corresponding to the relationship between the cleaning efficiency and the amount of air to be removed, etc. In this case, if the treatment entrance concentration is known, it is sufficient to measure only the treatment exit concentration.

DESCRIPTION OF THE PREFERRED EMBODIMENTS (EMBODIMENT 1)

Figure 4:
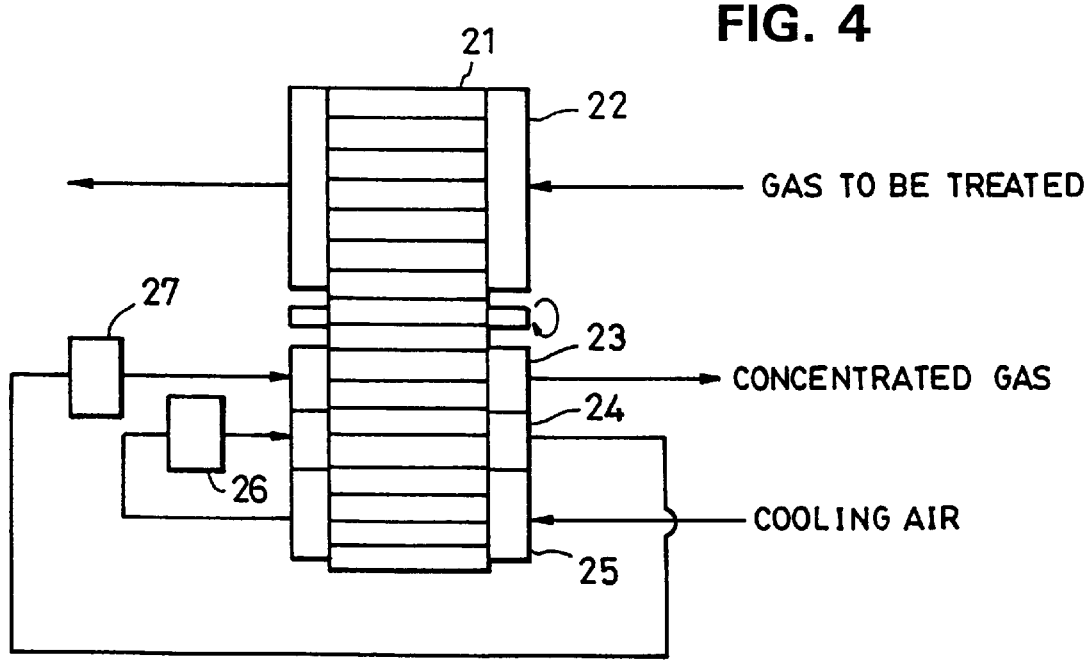
FIG. 4 is a diagram showing an outline of still another embodiment of the invention.
Figure 5:
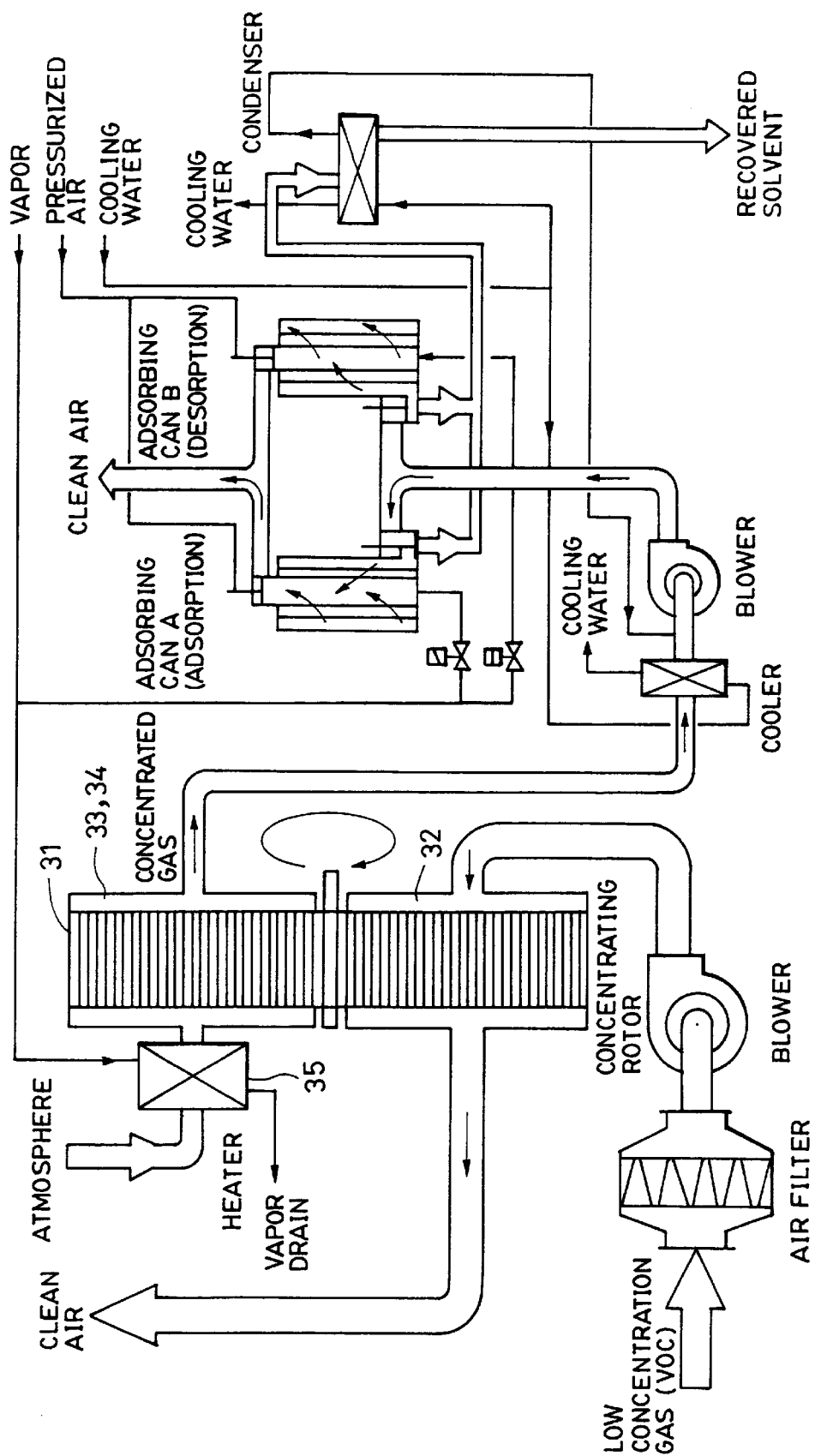
FIG. 5 is a diagram showing construction of a solvent recovering equipment using a prior art VOC concentrating apparatus.
Figure 6:
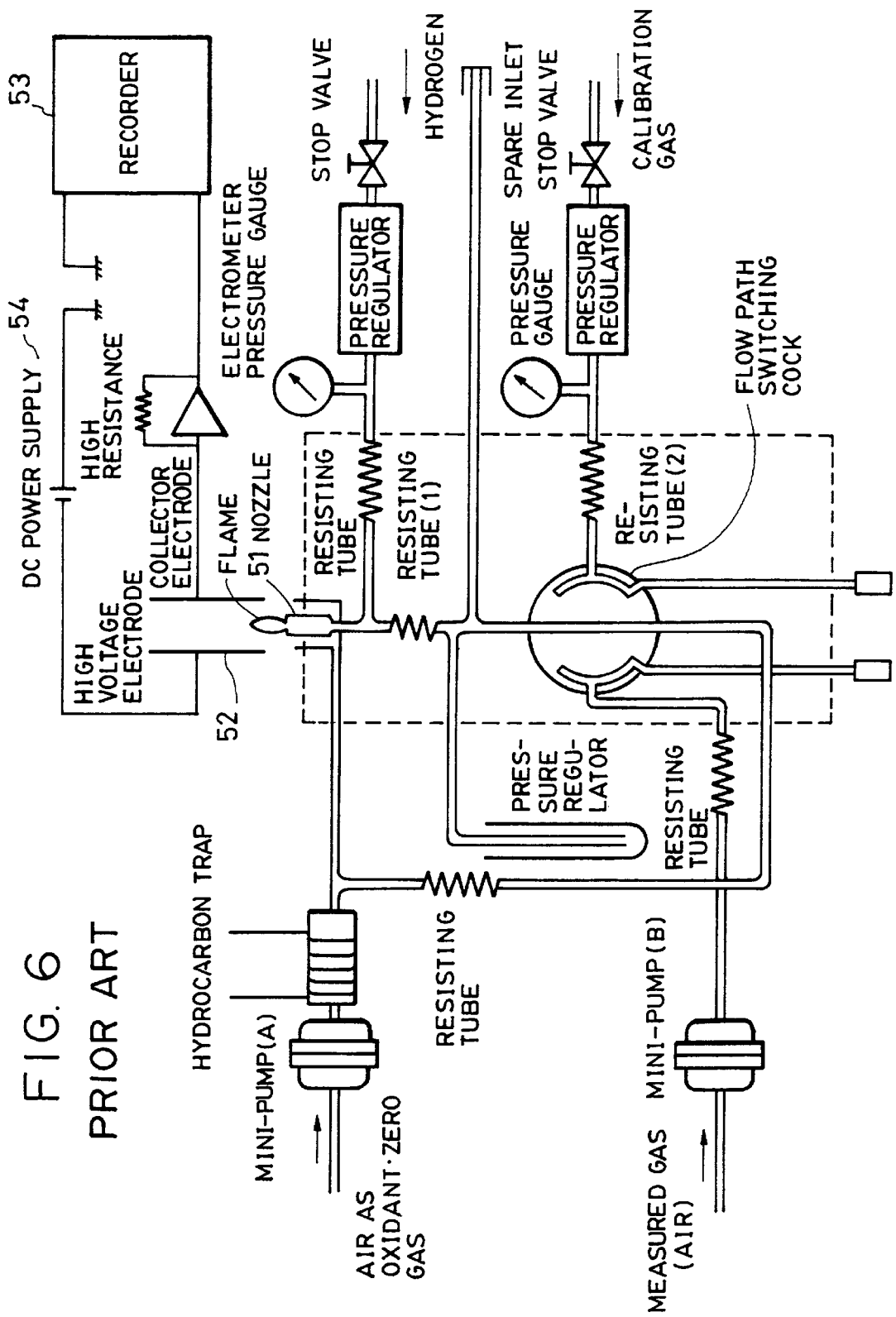
FIG. 6 is a diagram showing construction of a prior art hydrocarbon meter.

FIG. 4 shows construction of an apparatus according to the present embodiment.

In the apparatus the desorbing zone is divided into two parts in the peripheral direction of a honeycomb rotor. One of the parts of the desorbing zone divided into two, which is adjacent to the adsorbing zone, serves as a properly speaking desorbing zone 23, while the other, which is adjacent to the cooling zone 25, serves as a drying zone 24.

In this apparatus, air of atmosphere, which has passed through the cooling zone 25, passes through a heater 26 to be heated. After having entered the drying zone 24, the air is heated again by another heater 27 and enters the desorbing zone 23.

Since the gas to be treated passes twice through the desorbing zone, it is possible to obtain a high concentration in the concentrated gas.

In addition thereto, following effects can be obtained.

VOC adsorbed in the rotor passes through the drying zone 24 after having passed through the desorbing zone 23, enters the cooling zone 25, and proceeds again to the adsorbing zone.

Since the drying zone 24 is a region succeeding the desorbing zone 23 from the view point of movement of the rotor and there the major part of VOC has been already desorbed in the desorbing zone 23, it can be said that the drying zone 24 is a region where moisture is removed.

Since the drying zone 24 is a region, through which air of atmosphere, which has passed through the cooling zone 25, passes, from the view point of flow of air of atmosphere and the air of atmosphere passing therethrough is used principally for removing moisture, it contains only a so small amount of VOC that there is no problem, even if the air of atmosphere, which has passed therethrough, is heated. Therefore the air of atmosphere, which has passed through the drying zone 24, can be heated again by means of the heater 26.

A certain amount of heat is required for desorbing VOC from the rotor, which has adsorbed VOC.

Two sorts of amount of heat are required, one of which is for heating the rotor, while the other is for desorbing VOC.

Consequently the fact that air of atmosphere, which has passed through the drying zone 24, can be heated again by means of the heater 26 means that the amount of heat for desorbing VOC can be given again to the air of atmosphere and therefore it is possible to raise the regeneration efficiency.

Gas to be treated containing methylene chloride at 300 ppm and methanol at 200 ppm (concentration of 500 ppm in total) was introduced into the adsorbing zone 22 of this apparatus under a condition of 90% RH and an amount of air flow of 500 m$^3$/min.

The concentration on the exit side of the adsorbing zone 22 was methylene chloride 45 ppm and methanol of 40 ppm. Further, the amount of air flow at that time was 83 m$^3$/min. Using these data, it was confirmed that the magnification of the concentration was 6.

(EMBODIMENT 2)

Figure 1:
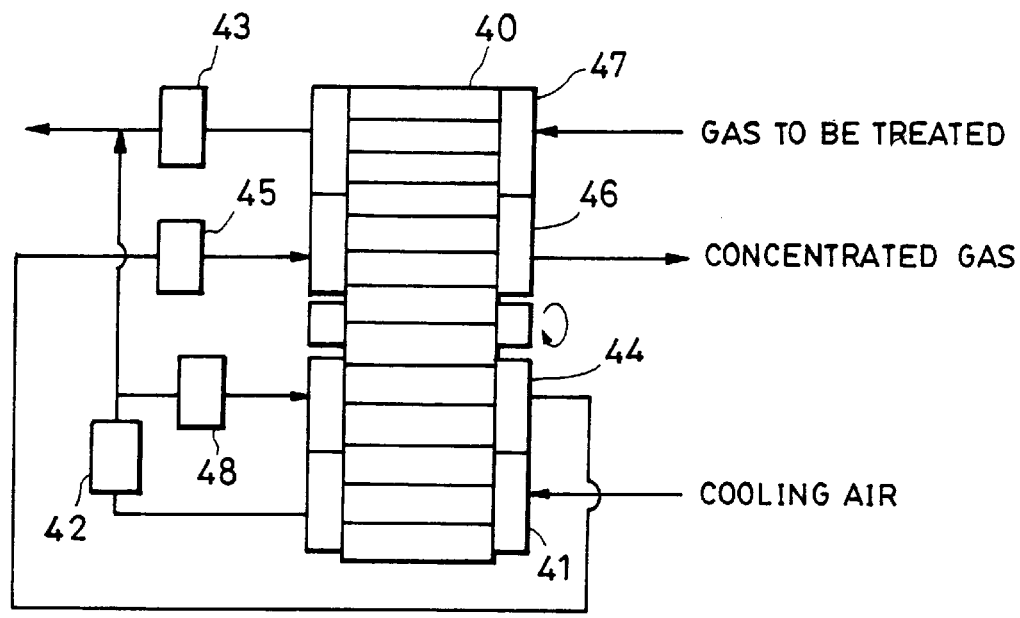
FIG. 1 is a diagram showing an outline of an embodiment of the invention.

FIG. 1 shows construction of an apparatus according to the present embodiment.

Paper serving as raw material for a honeycomb rotor 40 having a cylindrical honeycomb construction is made of alumina-silica fiber, to which a small amount of organic synthetic fiber is added, which honeycomb construction carries synthetic zeolite. Supposing that the concentration of VOC in the gas to be treated is known, the concentration is measured, after the gas has passed through the adsorbing zone 47, and thereafter the gas is released in the atmosphere.

Cooling air is divided into two by a damper 42 for regulating air flow, after having entered the cooling zone 41. A part of the cooling air enters the desorbing zone 44 through a heater 48, while the other part is released in the atmosphere.

Air coming out from the desorbing zone 44 enters again the desorbing zone 46 again through a heater 45. In this way a complete regeneration is effected.

In this apparatus a concentration detector 43 is disposed on the exit side of the adsorbing zone to measure the exit concentration and the amount of air sent to the desorbing zone 44 is determined by regulating the air flows obtained by division by means of the damper 42 for regulating air flow so as to obtain a predetermined concentration, i.e. a desired cleaning efficiency.

In the present embodiment gas to be treated containing methylene chloride at 300 ppm and methanol at 200 ppm (concentration of 500 ppm in total) was introduced into the adsorbing zone 47 under a condition of 90% RH and an amount of air flow of 500 m$^3$/min.

The amount of air introduced into the desorbing zone 44 was controlled by means of the damper 42 for regulating amount of air flow by dividing the amount of air, which was introduced into the cooling zone 41, so that the cleaning efficiency is greater than 83% (concentration of VOC below 85 ppm).

The amount of air at that time was 83 m$^3$/min. The concentration on the exit side of the adsorbing zone 47 was 48 ppm for methylene chloride and 33 ppm for methanol (81 ppm in total). The magnification of the concentration was 6.

(EMBODIMENT 3)

Figure 2:
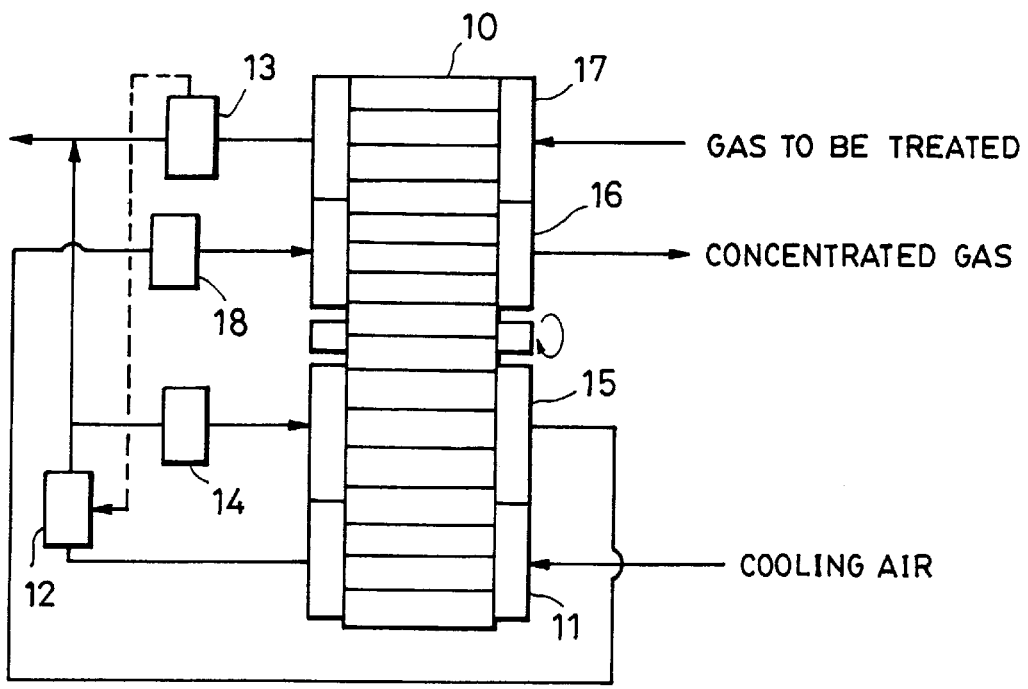
FIG. 2 is a diagram showing an outline of another embodiment of the invention.
Figure 3:
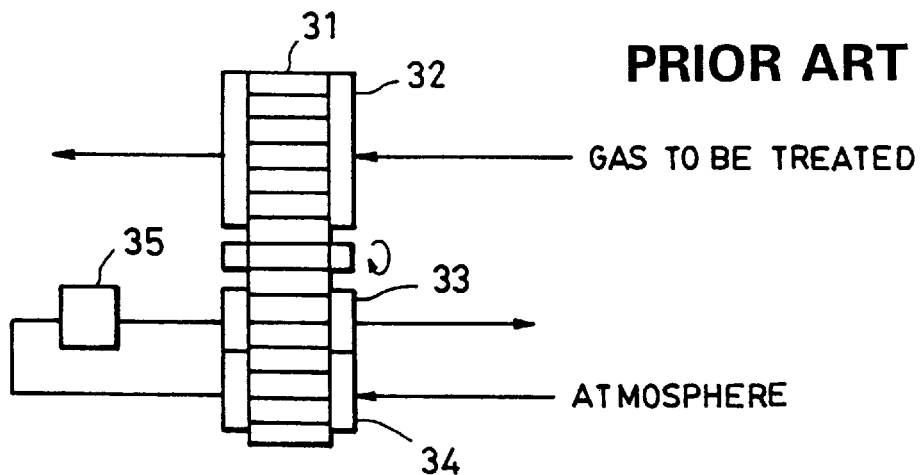
FIG. 3 is a diagram showing an outline of an example of a prior art gas treating apparatus using a honeycomb rotor.

FIG. 2 shows construction of an apparatus according to the present embodiment.

A honeycomb rotor 10 has the same construction as that used in EMBODIMENT 2.

In the present embodiment there are disposed a damper 12 for regulating automatically amount of air flow downstream with respect to a cooling zone 11 and a concentration detector 13 downstream (on the exit side) with respect to an adsorbing zone 17. The damper 12 for regulating automatically amount of air flow is controlled so that the detected concentration is below a predetermined value.

Cooling air, which has passed through the cooling zone 11 is divided by the damper 12 for regulating automatically amount of air flow, depending on the concentration detected by the concentration detector 13, so that a part thereof is air used for desorption. The air used for desorption is heated by a heater 14, passes through a first desorbing zone 15, heated again by a heater 18, introduced again into a second desorbing zone 16, and becomes finally concentrated gas.

In this apparatus, similarly to EMBODIMENT 1, gas to be treated contains methylene chloride at 300 ppm and methanol at 200 ppm was used under a condition of 27° C. and 90% RH and the amount of air introduced into the cooling zone 11 was 500 $Nm^3$/min. The treatment was effected so that the cleaning efficiency at that time was 86%.

The set value of the concentration detector 13 at the exit is set so that the cleaning efficiency is over 86% (concentration below 70 ppm) and the amount of air sent to the desorbing zone 16 is regulated by the damper 12 for regulating automatically air flow so as to obtain this value of the concentration.

The amount of air sent to the desorbing zone 16, when treatment was effected in this way, was 81 to 84 $Nm^3$/min. The concentration on the exit side of the adsorbing zone 17 was methylene chloride 39 to 41 ppm and methanol 26 to 29 ppm (65 to 70 ppm in total). The magnification of the concentration was 6.

As explained above, according to the present invention, it is possible to obtain concentrated gas at a high concentration and at the same time to raise the regeneration efficiency. Further, since it is possible to lower the adsorption exit concentration and at the same time to regulate the amount of air flow introduced into the adsorbing zone, independently from the amount of cooling air flow, it is possible to separate organic compound with a high magnification of the concentration.

What is claimed is:

1. A gas treating apparatus, in which a honeycomb rotor is driven so that the honeycomb rotor passes through an adsorbing zone, a desorbing zone, a drying zone and a cooling zone one after another in this order, gas to be treated being made to pass through said adsorbing zone, at the same time air, which has passed through said cooling zone, being heated, and concentrated gas is taken out while introducing the air thus heated into said desorbing zone, comprising:

first heating means disposed so as to heat the air, which has passed through said cooling zone, and to introduce the air into said desorbing zone; and second heating means disposed so as to heat the air, which has passed through said drying zone and to introduce the air into said desorbing zone.

2. A gas treating apparatus, in which a honeycomb rotor is driven so that the honeycomb rotor passes through an adsorbing zone, a desorbing zone and a cooling zone one after another in this order, gas to be treated being made to pass through said adsorbing zone, at the same time air, which has passed through said cooling zone, being heated, and concentrated gas is taken out while introducing the air thus heated into said desorbing zone, further comprising:

control means for controlling an amount of the heated air passing through said desorbing zone by removing a part of the air, which has passed through said cooling zone.

3. A gas treating apparatus according to claim 2, wherein said desorbing zone is divided into a plurality of zones and said control means is disposed in one of said zones.

4. A gas treating apparatus according to claim 3, further comprising means for measuring concentration at an exit of the last zone of said desorbing zones.

5. A gas treating apparatus according to claim 2, further comprising means for measuring cleaning efficiency in said adsorbing zone.

6. A gas treating apparatus according to claim 2, wherein said control means includes a damper for regulating the amount of air flow.

* * * * *